United States Patent [19]

Bothwell

[11] 3,834,249

[45] Sept. 10, 1974

[54] HANDLEBARS

[76] Inventor: Peter William Bothwell, 114 Shipston Rd., Stratford-On-Avon, England

[22] Filed: Mar. 13, 1973

[21] Appl. No.: 340,717

[52] U.S. Cl. .................. 74/551.8, 2/17, 74/551.9
[51] Int. Cl. ........................................ B62k 21/12
[58] Field of Search ............. 74/551.8, 551.9; 2/17

[56] References Cited
UNITED STATES PATENTS

| 1,451,411 | 4/1923 | Wendling | 74/551.9 |
| 2,591,523 | 4/1952 | Dick | 2/17 |
| 3,227,455 | 1/1966 | Hulsman | 74/551.9 X |
| 3,645,151 | 2/1972 | Yoshikawa | 74/551.9 |

FOREIGN PATENTS OR APPLICATIONS

| 14,944 | 11/1898 | Great Britain | 2/17 |
| 454,974 | 7/1913 | France | 74/551.9 |
| 1,028,059 | 5/1953 | France | 74/551.9 |

Primary Examiner—Samuel Scott
Assistant Examiner—F. D. Shoemaker
Attorney, Agent, or Firm—Kurt Kelman

[57] ABSTRACT

A handlebar for a motor cycle or the like, which has at one or each end thereof a hand-grip portion and a generally U-shaped rigid guard. The two ends of the guard are connected to the handlebar at respectively opposite ends of the hand-grip portion so that when the handlebar is in use the guard projects forwardly of the hand grip portion and defines with the latter an opening for a rider's hand gripping said portion, whereby the guard affords protection for the hand in the event of a crash. The guard is provided with a covering of resiliently deformable material. The covering extends around the part of the handlebar to which the inner end of the guard is secured and the outer end of the guard is connected to the outer end of the handlebar by a removable plate. The covering is recessed to receive the free end of a pivotable control lever whilst permitting movement of the lever relative to the handgrip portion.

6 Claims, 3 Drawing Figures

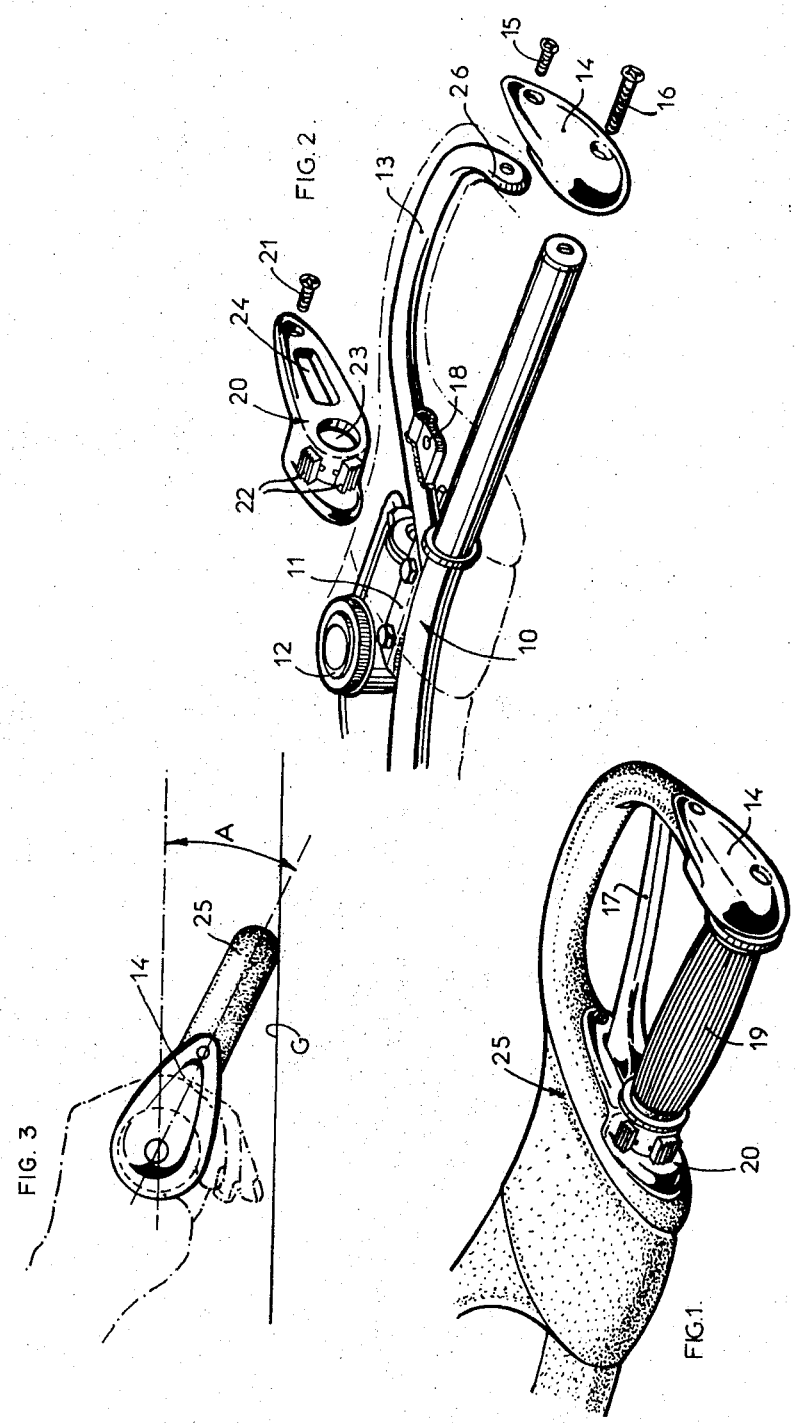

HANDLEBARS

BACKGROUND OF THE INVENTION

1. Field of the Invention

This invention relates to handlebars for, for example, motor cycles, pedal cycles and invalid carriages.

For convenience, the following description of the invention will be confined to handlebars for motor cycles but it is to be understood that there is no limitation in this regard.

2. Description of the Prior Art

The hands of a rider grasping the handlebar of a motor cycle are particularly vulnerable to injury in a crash. It has been proposed to provide handlebars with hand protectors or shields but conventional protectors or shields often do not provide effective protection for the hands in a crash. The protectors or shields may not be sufficiently strong or fixed to the handlebar with sufficient rigidity to provide adequate protection for the hands in a crash or they may be made of a material which is likely to fragment on impact and if this occurs the fragments may penetrate the hands. They may have sharp angular projections likely to injure the hands in a crash. Conventional protectors or shields may also be unsatisfactory since when they slide along in contact with the ground in a crash they tend to dig into the ground.

It is an object of the present invention to provide a simple handlebar construction which provides adequate protection for a rider's hands in a crash.

SUMMARY OF THE INVENTION

According to the invention I provide a handlebar for a motor cycle or the like, which has at one or each end thereof a hand grip portion and a generally U-shaped rigid guard, the two ends of the guard being connected to the handlebar at respectively opposite ends of the hand-grip portion so that when the handlebar is in use the guard projects forwardly of the hand-grip portion and defines with the latter an opening for a rider's hand gripping said portion, whereby the guard affords protection for the hand in the event of a crash, and the guard being provided with a covering of resiliently deformable material.

This handlebar construction has various advantages compared with handlebars provided with conventional hand protectors or shields. Since the guard is rigid and connected at both its ends to the handlebar it is strong and firmly secured to the handlebar so that it does not break or deform or move relative to the handlebar on an impact. The provision of a covering of a resiliently deformable material enables the guard to be smoothly contoured without any projections likely to injure the hand in a crash.

The cross-sectional dimensions of the guard with its covering preferably of the same order as the cross-sectional dimensions of the hand grip portion of the handlebar. This arrangement ensures that the hand does not become trapped in the opening defined by the guard and the hand grip portion if it is forced off the latter in a crash as happens, for example, when the rider is thrown from the motor cycle.

The guard is preferably disposed in a plane which is slightly downwardly inclined, for example at an angle of 20° – 30°, with respect to the horizontal. In a crash, therefore, it is the guard which comes into contact with the ground so that the hand is not trapped between the hand grip portion and the ground.

The handlebar may include a control lever, for example a brake or clutch lever, pivotally mounted at one end thereof on the handlebar or the guard adjacent to the inner end of the guard and extending towards the outer end portion of the guard so as to be disposed in the opening defined by the hand-grip portion and the guard, and in this event the covering of the guard is preferably recessed to receive the other end of the control lever whilst permitting movement of the lever relative to the hand-grip portion, thereby to prevent the rider's hand being trapped between said other end of the lever and the guard.

Preferably the covering of the guard extends around the portion of the handlebar to which the inner end of the guard is secured. The outer end of the guard is preferably connected to the outer end of the handlebar by a removable plate.

BRIEF DESCRIPTION OF THE DRAWINGS

The invention will now be described by way of example with reference to the accompanying drawings, in which:

FIG. 1 is a perspective view of one end of a motor cycle handlebar embodying the invention, FIG. 2 is an exploded perspective view of said end of the handlebar with parts thereof removed, and FIG. 3 is a diagrammatic side view of said end of the handlebar.

DESCRIPTION OF THE PREFERRED EMBODIMENT

The drawings show the right-hand end portion of a motor cycle handlebar 10. This end portion of the handlebar carries a bracket 11 which supports a hydraulic brake cylinder 12. The bracket 11 assists in supporting the inner end of a rigid metal guard 13 which is secured to the handlebar 10 adjacent the bracket 11, the guard being of generally U- or semi-circular shape in plane view and of tubular construction. A plate 14 is secured by a screw 15 to the outer end of the guard 13 and by a screw 16 to the outer end of the handlebar 10, the plate 14 providing a removable connection between the outer end of the guard 13 and the outer end of the handlebar 10.

A brake lever 17 for operating the brake cylinder 12 is pivotally mounted on a flange 18 secured to the guard 13 and a twist-grip accelerator control 19 constituting a hand-grip portion is rotatable around the end portion of the handlebar 10 in the normal way. The ends of the guard 13 are therefore connected to the end portion of the handlebar at opposite ends of the twist-grip control 19, and the latter can be removed for repair or maintenance by unscrewing the plate 14.

The guard 13 is arranged so that it projects forwardly of the twist-grip control 19 and defines with the latter an opening for a rider's hand grasping the control, whereby the guard provides protection for the hand in a crash.

A switch escutcheon 20 secured to the flange 18 by a screw 21 carries a pair of operating switches 22 of the electrical system of the motor cycle and is formed with two apertures 23 and 24 for the passage therethrough of the handlebar 10 and the brake lever 17.

The portion of the handlebar 10 to which the inner end of the guard 13 is secured, the cylinder 12 and the guard are provided with a smoothly contoured covering 25 of soft foam rubber with the rubber around the outer end portion 26 of the guard 13 being recessed to receive the end of the brake lever 17 whilst permitting movement of the latter relative to the twist-grip control 19, thereby to prevent the motor cyclist's hand being trapped between the lever 17 and the guard 13.

The diameter of the guard 13 with its covering 25 is of the same order as the diameter of the twist-grip control 19.

As shown in FIG. 3 the guard 13 is disposed in a plane which is downwardly inclined at an angle A of 20° – 30° with respect to the horizontal. The arrangement, therefore is such that if the rider is thrown from the motor-cycle in a crash his hand does not become trapped in the opening defined by the guard and the twist-grip control and if the handlebar hits the ground G with the rider's hand still gripping the twist-grip control it is the guard which comes into contact with the ground so that the hand is not trapped between the twist-grip control and the ground.

A guard arrangement similar to that described above is provided at the left-hand end of the handlebar where the clutch lever is usually provided.

The guard arrangement of the invention provides protection for the rider's hands without adding appreciably to the cost or complexity of the motor-cycle.

I claim:

1. A handlebar for a motor cycle or the like, which has at one end thereof a hand-grip and a generally U-shaped rigid guard, the two ends of the guard being rigidly fixed to the handlebar adjacent respectively opposite ends of the hand-grip and the guard projecting forwardly of the hand-grip to define with the latter an opening for a rider's hand gripping said hand-grip whereby the guard affords protection for the hand in the event of a crash, and the guard being provided with a covering of resiliently deformable material.

2. A handlebar as claimed in claim 1 wherein the cross-sectional dimensions of the guard with its covering are of the same order as the cross-sectional dimensions of the hand-grip.

3. A handlebar as claimed in claim 1 wherein the guard is disposed in a plane which is slightly downwardly inclined with respect to the horizontal.

4. A handlebar as claimed in claim 1 including a control lever pivotally mounted at one end thereof on the guard adjacent to the inner end of the guard and extending towards the outer end portion of the guard so as to be disposed in the opening defined by the hand-grip and the guard, wherein the covering of the guard is recessed to receive the other end of the control lever whilst permitting movement of the lever relative to the hand-grip, thereby to prevent the rider's hand being trapped between said other end of the lever and the guard.

5. A handlebar as claimed in claim 1 wherein the covering of the guard extends around the portion of the handlebar to which the inner end of the guard is secured.

6. A handlebar as claimed in claim 1 wherein the outer end of the guard is connected to the outer end of the handlebar by a removable plate.

* * * * *